United States Patent Office 3,188,348
Patented June 8, 1965

3,188,348
12a-DEOXYTETRACYCLINE OXIDATION
PROCESS
Kenneth Butler, Waterford, Conn., Robert B. Woodward,
Belmont, Mass., and Philip N. Gordon, Old Lyme,
Conn., assignors to Chas. Pfizer & Co., Inc., New York,
N.Y., a corporation of Delaware
No Drawing. Filed July 9, 1962, Ser. No. 208,343
7 Claims. (Cl. 260—559)

This application is a continuation-in-part of our copending application Serial Number 168,797 filed January 25, 1962, and now abandoned and an application Serial Number 21,596, filed April 12, 1960, and now abandoned.

This invention is concerned with a new method of preparing tetracycline antibiotics and more particularly is concerned with a new method of preparing tetracycline antibiotics by the introduction of a 12a-hydroxy group into a 12a-deoxytetracycline.

12a-deoxytetracyclines are known compounds which may be prepared by reaction of a tetracycline compound with zinc in aqueous solution of ammonia as described in South African Patent 660/59. Alternatively 12a-deoxytetracyclines may be prepared by catalytic hydrogenation in a substantially anhydrous reaction inert solvent of a 12a-(O-acyl) derivative of the desired tetracycline antibiotic wherein the acyl radical is that of a hydrocarbon carboxylic acid containing from 1 to 6 carbon atoms, or of the corresponding 12a-(O-arylcarbamyl) derivative of the appropriate tetracycline as described in United States Patent No. 3,002,021.

The 12a-deoxytetracyclines useful as reactants in the novel process of the present invention are not limited as to type, number or location of substituent groups about the nucleus. Thus, they include:

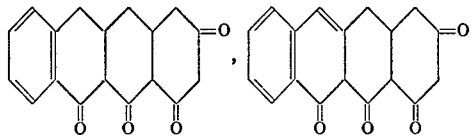

tautomeric forms thereof and mono- and poly-substituted analogs thereof, the substitution of said substituted analogs being limited to the 2, 4a, 5, 5a, 6, 7, 8, 9, 10 and 11a positions. For example, one or more D-ring substituents such as hydrogen, bromo, iodo, chloro, fluoro, trifluoromethyl, nitro, cyano, amino, cyanato, thiocyanato, azido, lower alkylamino, alkanoylamino containing 2 to 4 carbon atoms, lower alkyl and mono-substituted lower alkyl wherein the substituent thereof may be fluoro, lower alkylmercapto, lower alkoxy, amino, lower alkylamino, and alkanoyloxy and alkanoylamino each containing 2 to 4 carbon atoms; and YR wherein Y is oxygen or sulfur and R may be lower alkyl, benzyl and alkanoyl containing 2 to 4 carbon atoms, may be present without affecting the operability of the process.

The 2, 4, 5 and 6-positions may have a wide variety of substituents, e.g., cyano, carboxamido or N-t-butylcarboxamido at C–2; dimethylamino or hydrogen at the 4-position; hydrogen, lower alkoxy, benzyloxy or hydroxy at C–5; methyl and hydroxy, methyl and hydrogen or methylene or hydrogen only at C–6. Further, substituent groups such as enumerated above for the D-ring can be at these positions without detriment to the operability of the process. Additionally, unsaturation as in the 12a-deoxyanhydrotetracyclines, or internal bonding as in the 11a-halotetracycline-6, 12-hemi-ketals may be present.

Of special interest are the 10-hydroxy; 9-amino and nitro; 7-amino, nitro and halogen; 5-hydrogen, alkyl and fluoro; 6-hydrogen, hydroxy, alkyl and fluoro; 11a-fluoro; the 4-NR$_1$R$_2$ group wherein R$_1$ and R$_2$ when taken separately are each selected from the group consisting of hydrogen, aralkyl containing a total of up to 10 carbon atoms, amino, mono- and di-lower alkylamino, acyl containing 1 to 4 carbon atoms, phenyl and mono-substituted phenyl wherein the substituent is selected from the group consisting of lower alkyl and lower alkoxy; and CH$_2$B$_1$ wherein B$_1$ is selected from the group consisting of hydrogen, lower alkyl, lower carbalkoxy, and mono-substituted lower alkyl, said substituent being selected from the group consisting of fluoro, hydroxy, lower alkoxy, amino, mono- and di-lower-alkylamino, lower carbalkoxy, and acylamino and acyloxy each containing 2 to 4 carbon atoms.

The 2-position may bear an X$_1$ wherein X$_1$ is selected from the group consisting of hydrogen, cyano,

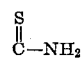

lower carbalkoxy; and

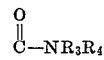

in which R$_3$ and R$_4$ when taken together with the nitrogen to which they are attached form a nitrogen heterocyclic ring selected from the group consisting of pyrryl, piperidyl, pyrrolidyl, morpholinyl, piperazyl and thiomorpholinyl;

R$_3$ when taken separately is selected from the group consisting of hydrogen, lower alkyl, aralkyl containing up to a total of 10 carbon atoms, phenyl, di-lower-alkylamino and ZX$_2$ wherein X$_2$ is selected from the group consisting of hydroxy and lower alkoxy and Z is alkylene of 2 to 5 carbon atoms;

R$_4$ when taken separately is selected from the group consisting of hydrogen and lower alkyl.

Other substituents and combinations of substituents too numerous for special mention may be present.

The preferred substituents at the various positions are: carboxamido or a group readily convertible or replaceable by a carboxamido group, e.g., cyano, carboxy, carbalkoxy, hydrogen and N-t-butylcarboxamido at the 2-position; dimethylamino group at the 4-position; hydrogen, or halogen at the 7-position; a 9-hydrogen, amino or nitro group; a 10-hydroxy group or group readily transformable to a 10-hydroxy group, e.g., alkoxy, benzyloxy; hydrogen or hydroxy at the 5-position; hydroxy and/or methyl and hydrogen at C–6.

The operability of this process for introducing a 12a-hydroxy group depends only on the presence of the 1, 11 and 12 keto groups (or tautomeric forms thereof) and is independent of the nature of the other substituents present. Certain substituent groups may be transformed to other substituents during the course of the reaction, for example an N-alkylamino and mercapto group may form the corresponding oxides, removal of 11a-bromo or iodo may occur. However, the rather mild conditions of the process do not, in general, cause transformations on the substituent groups of the substrate or product.

Many of the 12a-hydroxylation products produced by this process may possibly be inactive or of low activity. However, it will be possible, in many instances, to convert them to active products by the introduction, via known procedures, of appropriate groups; e.g., of carboxamido at C–2, a D-ring substituent by halogenation, nitration, followed by reduction and Sandmeyer type replacements of the resulting amino group, conversion of an anhydrotetracycline to tetracycline or 5-hydroxytetracycline by biochemical methods.

D-ring substituted 12a-deoxytetracyclines are prepared from the appropriate D-ring unsubstituted 12a-deoxytetracycline by known procedures as set forth in Chilean Patent No. 17,249. For example, the diazonium coupling process described therein permits introduction of an amino group at the 7- or 9- positions. Subsequent replacement of the amino group by Sandmeyer type reactions affords D-ring substituted 12a-deoxytetracylines wherein the substituent is halogen, nitro, cyano, cyanato, thiocyanato, azido, arsenoxy, mercapto, mercaptophenyl or mercaptoalkyl. When the D-ring unsubstituted 12a-deoxytetracycline precursor has at least one hydrogen atom in the 6-position, direct nitration produces the 7-nitro and 9-nitro derivatives. Chemical or catalytic reduction of the nitro 12a-deoxytetracyclines gives the corresponding amino 12a-deoxytetracyclines which are transformable via diazotization and Sandmeyer type reactions to the various aforementioned groups.

The process of the present invention is unexpectedly accomplished by contacting the starting 12a-deoxytetracycline in the form of a metal salt complex (metal chelate) with an oxidizing substance in a reaction-inert solvent.

Reaction temperature does not appear to be critical in the present process although it is generally preferred to carry out the reaction at temperatures below 50° C. since the use of higher temperatures may lead to the formation of undesirable by-products and thus result in lower yields of the desired tetracycline. Temperatures as low as 0° C. may be employed but it is preferred to operate at room temperature, i.e., temperatures ranging between about 20 and 30° C. for best results. The time required for the reaction may vary considerably with the chelating metal and the oxidizing substance used. Time periods ranging from 5 minutes to 3 days give substantial amounts of the desired tetracycline product. The progress of the reaction may be conveniently followed by conventional techniques, for example, paper chromatographic techniques, using the known solvent systems. Bioassay may also be used to follow the course of the reaction since the final tetracycline products are generally more active than the corresponding 12a-deoxy compounds.

By "reaction-inert solvent" as employed herein is meant a solvent which dissolves the reactants but does not react to any appreciable extent with the reactants or the products under the conditions described. Of course, during the course of the present process some of the herein described solvents may react with the oxidizing agent, e.g., ethers from peroxides, but not to any appreciable degree. Suitable solvents include water, lower alkanoic acids, e.g., acetic, propionic, and the like, alkanols, preferably lower alkanols, e.g., methanol, ethanol and propanol, diethyl ether, dimethylformamide, dioxane, tetrahydrofuran, lower alkyl ethers of glycols such as dimethyl ether of ethylene glycol, the monomethyl ether of ethylene glycol, the dimethyl ether of diethylene glycol, and the like, and other such solvents. A minimum of laboratory experimentation will enable the selection of other reaction-inert solvents for the present process. For example, small scale laboratory reactions may be used to determine the operability of a solvent in the present process.

The present process in aqueous solution is effective over a wide range of pH from about pH 2 to about pH 11. It is generally preferred to employ pH ranges between 4 and 5 and between 9.5 and 11 since best results are obtained with their use.

By an "oxidizing agent" as employed herein is meant oxygen gas, air, N-oxides of tertiary organic amines, or hydrogen peroxide, all of which may be used in the present process with substantially equivalent results. Ozone can also be used as oxidizing agent but offers no advantage over the previously mentioned agents. In lieu of hydrogen peroxide, metal peroxides may be used, preferably alkali metal (Na, K, Li) peroxides, since these are most economical and readily available. Additionally, peracids may also be used in this regard. Exemplary of such acids are peracetic and perbenzoic acids which are commonly used for oxidation processes. The peracids may be used as such or formed in situ by reaction of the corresponding acid with hydrogen peroxide. When peroxides or N-oxides of tertiary organic amines are used, it is suggested that at least an equimolar amount be employed although it is generally preferred to use excess particularly in the case of peroxide because of the tendency of this substance to decompose. Best results are obtained when approximately 5 molar equivalents of peroxide to the starting compound are used. The use of from about 5 to about 10 equivalents of peroxide is found to materially shorten the reaction time required for the production of substantial amounts of the desired tetracycline compound and for this reason is preferred. Larger excesses up to 15 to 20 molar equivalents may be used but provide no appreciable advantage.

It is generally preferred to use pure oxygen since best results are obtained. When air or oxygen is employed, the gas, generally used in excess, is merely bubbled through the reaction mixture at any desired rate, although it is usually preferred to allow the gas to pass through at a rather rapid rate to ensure the maintenance of a high concentration of oxygen in the reaction mixture at all times. Alternatively, the reaction can be conducted in a closed system to permit the use of gas (air or oxygen) pressures greater than atmospheric pressure. Such systems are, however, generally inconvenient and it is preferred to employ an open system with an excess of air or oxygen.

The N-oxides of tertiary organic amines may be used per se or formed in situ by reaction of the tertiary amine with one of the hereinbefore described oxidizing agents, e.g., oxygen, air or peroxides. In the latter case, the tertiary amine N-oxide may be pre-formed in a suitable reaction mixture and the 12a-deoxytetracycline then reacted with the N-oxide, in the presence of a catalyst.

Suitable tertiary amines may be readily determined by simple laboratory experimentation. Preferred tertiary amines are hydrocarbon tertiary amines including: trialkylamines, e.g., trimethylamine, triethylamine, tributylamine, dimethylbutylamine, and the like; di-lower alkylarylamines, e.g., dimethyl and diethylaniline, dimethyl toluidine and the like; dialkylaralkylamines, e.g., dimethylbenzylamine and diethylphenethylamine; heterocyclic tertiary amines, e.g., pyridine and the lower alkyl pyridines, e.g., alpha- and beta-picolines, alpha-ethylpyridine and the like. The hydrocarbon tertiary amines, i.e., those containing only carbon and hydrocarbon in the hydrocarbon moiety, are preferred since they are most economical and readily obtainable. A variety of additional tertiary amines may also be employed in the present process including substituted derivatives of the above-mentioned tertiary amines, in which the substituent is halogen, alkoxy, hydroxy, nitro, etc., but such amines are not as economical or readily available as the preferred amines.

By "metal chelate" as employed herein is meant a complex salt of the 12a-deoxytetracycline reactant and a metal capable of forming chelates therewith. Metals especially effective in the process of this invention are the following: alkaline earth metals such as calcium, strontium, and barium, the transition metals of groups IIIB to VIIB inclusive, particularly vanadium, titanium, chromium, manganese, iron, cobalt, nickel, palladium, ruthenium, platinum silver, zinc, tin, lead, cerium and cadmium. Such metals are well known in the art and include the light and heavy metals of groups IB IIB, IIIB, IVB, VB, VIB, VIIB, VIII, IIA, IIIA, IVA of the Periodic Chart of the Elements. Other metals suitable for the present process may be determined by a simple test procedure which involves small scale laboratory runs of the present process. For example, a suitable 12a-deoxytetracycline starting compound is dissolved in selected solvents and the test metal or metal salt added to the reaction mixture. The mixture is oxygenated by the method described herein and the reaction mixture assayed for the presence of tetracycline by any of the known standard methods, e.g., paper chromatography and/or bioassay. In this manner other effective metals may be determined.

The metal may be used in the elemental form or as a salt, e.g., the oxide, iodide, chloride, bromide, sulfate, acetate, nitrate, phosphate and the like. The metal or metal salt employed need not be soluble in the inert-reaction solvent. It is obvious that the elemental form of the metal will not be in a state of true admixture with the solvent or even with the solvent and other reactant. However, it has been found that the elemental form of the effective metals, the oxides or other solvent insoluble salts thereof, are actually bound by the 12a-deoxytetracycline reactants apparently via chelate or complex formation and catalyze conversion to the corresponding 12a-hydroxytetracycline. The elemental metal or solvent-insoluble salt should, of course, be in a finely divided form for optimum results. This surprising behavior is readily demonstrated by shaking a solution of a 12a-deoxytetracycline in a reaction-inert solvent with the elemental metal or reaction-inert solvent insoluble salt thereof, for a period of time sufficient to permit chelate formation, filtering the resulting mixture, preferably in the absence of air, and dividing the filtrate into two equal portions. One volume is oxygenated as described above, the other remains unoxygenated and serves as control. Assay of the oxygenated portion following completion of the oxygenation process shows a significant and substantial conversion of 12a-deoxytetracycline to the corresponding tetracycline.

In actual practice the elemental metal or insoluble metal salt need not be removed by filtration prior to oxygenation. On the contrary, it is expedient to keep the metal or metal salt in the reaction mixture since this avoids the necessity of (1) filtering the reaction mixture, (2) preforming the metal chelate, (3) equilibrating the mixture of metal or metal salt and 12a-deoxytetracycline reactant prior to oxygenation, and maintains an adequate quantity of the metal source to ensure maximum chelate formation.

When it is desired to employ a solution of the metal salt, frequently to expedite reaction, the metal is introduced into the reaction mixture in the form of a salt soluble in the selected solvent system. This desideratum is perhaps best accomplished through the use of water as solvent since a wider variety of metal salts becomes available.

The elemental form of the metal can be used per se or, alternatively, can be adsorbed on a suitable porous support such as charcoal, calcium carbonate, various clays, pumice and silica gel. In many instances, for example, the noble metals, the use of the supported metal is advantageous since it affords a large surface area and finely divided form of the metal. Silver and silver salts, e.g., the oxide, are highly efficient catalysts for this process particularly when supported on a porous support such as calcium carbonate and silica gel. Ruthenium (5%) on charcoal actively effects the transformation to a 12a-hydroxytetracycline.

Highly active silver catalysts are prepared by known methods, for example, by immersing and stirring the porous catalyst support in an aqueous solution of a water soluble silver salt, e.g., silver nitrate, heating the suspension to permit degasification and more complete and uniform impregnation of the catalyst support. The suspension is then filtered, dried and the silver nitrate reduced to silver by treatment with hydrogen gas at an elevated temperature of at least about 150° C. Alternatively, the silver nitrate is converted to silver-silver oxide by thermal decomposition in the presence of an inert gas. If desired, small amounts of a promoter in the form of a water soluble salt are added to the suspension of silver nitrate-porous catalyst support to provide a promoted catalyst.

Additionally, mixed metal and/or metal salt systems are operative in this process. Such mixed catalysts are readily obtained by known methods, e.g., by coprecipitation of a mixture of two salts, barium and silver carbonate from an aqueous solution of their nitrates followed by drying and reduction of the carbonates with hydrogen gas.

Osmium tetroxide is advantageously employed as a suspension in water at pH levels of from about 2 to about 11 and preferably at pH levels of from about 4 to about 5.

It should be noted that the anion of the selected metal salt merely serves to maintain electrical neutrality of the reaction mixture. It is usually preferred, but not essential, to employ salts containing substantially inert anions since best yields are obtained with their use, particularly in aqueous reaction media. By "inert anions" as employed herein is meant anions which do not cause degradation of the tetracyclines of the present process, i.e., are compatible with the present reactants and products under the described reaction conditions. Such anions are well known to those skilled in the art and include the aforementioned as well as the following anions: propionate, butyrate, citrate, salicylate, benzoate, lactate, ferricyanide, nitrite, cyanide, thiocyanate, thiosulfate, hydroxide, bromate, iodate, tartrate and carbonate. Strongly oxidizing anions, e.g., permanganate, may cause undesired degradation of the present starting compounds and/or products and their use is preferably avoided since it may lead to appreciable lowering of the product yield. Similarly, strongly reducing anions are preferably not used.

As mentioned above, the 12a-deoxytetracycline starting compound is reacted in the form of a metal chelate. It is obvious that the metal chelate of the starting compound may be pre-formed or it may be produced in situ in the reaction mixture prior to oxygenation. It is generally preferred to prepare the metal chelate in situ since this procedure is usually found to be more convenient and efficient.

For this purpose, the chelating metal salts may be employed at catalytic levels in the reaction mixture, that is to say, as little as 0.1 molar equivalent based on the starting 12a-deoxy compound. It is generally preferred to employ a molar equivalent of the chelating metal salt to obtain best yields. The use of larger excesses of chelating metal salts is found operable. Since it provides no appreciable advantage and since its use may cause an appreciable variance in the pH of the reaction mixture, it is preferable to use substantially equimolar amounts of the selected salt with a tolerance of up to about 20 to 30%.

The concentration of the 12a-deoxytetracycline starting compound in the reaction mixture does not appear to be critical. It is usually preferred to use concentrations of at least 1 mg. per 100 ml. of solvent and up to about 10 g. per 100 ml. of solvent. Of course, even lower concentrations than 1 mg. per 100 ml. may be used but such concentrations are uneconomical, particularly in large scale production where their use will necessitate excessively large reaction volume resulting in inefficient operation. The reaction may also be carried out employing a slurry of the 12a-deoxytetracycline starting compound in the reaction mixture with comparable results.

In the hydroxylation of 4-desdimethylamino-12a-deoxytetracyclines with oxygen, air or peroxides, a marked improvement in the yield of 4-desdimethylaminotetracycline product is noted when the reaction is carried out in the presence of a tertiary amine. The amount of tertiary amine used does not appear critical since even catalytic amounts of amine are found to substantially improve the yield of product. The optimum amount of tertiary amine is readily determinable by routine experimentation using small scale reaction. The amount of liquid amine found generally useful ranges from about 1 to about 10 drops per 100 mg. of starting 12a-deoxytetracycline compound. The use of even larger quantities of amine is operable but provides no appreciable advantage and for this reason is not preferred. Suitable for this use are the aforementioned tertiary amines.

The tetracycline products are isolated from the reaction mixture by any of several standard procedures which may be employed for this purpose. One such procedure involves the precipitation of the chelating metal ion in the form of an insoluble salt, for example, in the case of some of the chelating metals by formation of the insoluble sulfide by treatment with hydrogen sulfide gas; in the case of alkaline earth metals, by precipitation as the insoluble carbonates. An alternative procedure is based on the stability of the metal complexes. For example, the manganese, magnesium, calcium, barium and strontium complexes may be decomposed by adjusting the pH of the reaction mixture to the isoelectric point where the complexes liberate the tetracycline material. The 12a-deoxytetracycline being much less soluble than the tetracycline they usually will precipitate from the solution and may be separated from the tetracycline in this fashion. Of course, the tetracycline product is obtained by concentration of the reaction mixture or by solvent extraction using such solvents as butanol or ethyl acetate. Concentration of the extract yields the product. An additional method for isolating tetracycline compounds involves treatment of the reaction mixture with a weakly acidic carboxylic acid resin which removes the chelating metal and provides the tetracycline product together with unreacted 12a-deoxytetracycline in the eluate usually in the form of the salt of the acid corresponding to the anion of the chelating metal salt. For best results it is preferred to employ salts of acids stronger than acetic or other organic monocarboxylic acids. For example, if the acetate salt is utilized in the hydroxlyation process, it is generally advisable to treat reaction mixture with a mineral acid to obtain the corresponding mineral acid salt with the liberation of acetic acid. The mixture of 12a-deoxytetracycline starting compound and the tetracycline product may be separated by column chromatography using standard chromatographic systems.

It has been observed that many metal chelates of 12a-deoxytetracyclines having at least one hydrogen in the 6-position, and particularly those having two hydrogen atoms at C-6, produce new and novel compounds in which hydroxylation beyond the 12a-hydroxylation appears to have occurred. Metals, especially hexa-coordinate, having octahedral orientation appear to promote additional hydroxylation, i.e., dihydroxylation. Particularly valuable in this respect, in view of the relatively high yield of the novel compounds produced, is manganese.

The products of the present process when applied to 12a-deoxytetracyclines wherein the C-4 substituent is other than hydrogen, comprises a tetracycline and corresponding 4-epitetracycline. The 4-epitetracyclines are obtained in varying amounts in this process. After separation from the tetracycline product, e.g., by column chromatography, they may be converted to corresponding tetracyclines by methods described in the literature, e.g., J.A.C.S 79, 2857 (1957).

It has been surprisingly found that the 12a-deoxytetracycline starting compound and the tetracycline product which contain a —$NR_1R_2$ group in the 4-position may be recovered and separated in the same operation by the use of certain ion-exchange resins. The exchange resins used in the separation and recovery process are anion exchange resins of the primary, secondary and tertiary amine type in the form of salts with the weak organic monocarboxylic acids, e.g., acetic, propionic, etc., and cation exchange resin such as weakly acidic carboxylic resin in the acid form.

When the reaction mixture containing the tetracycline product and 12a-deoxytetracycline starting compound as metal chelates, the anion of which is derived from a mineral acid is passed over the cation exchange resin, the metal ion is adsorbed and the tetracycline mixture eluted. The eluate is then passed over the anion exchange resin where the anion of the reaction mixture is exchanged for the resin anion, e.g., acetate, the 12a-deoxytetracycline is adsorbed and the tetracycline eluted as the acid salt corresponding to the resin anion, e.g., acetate. When the reaction mixture first is passed over the anion exchange, the anion of the reaction mixture is exchanged for the resin anion. When the eluate is then passed over the cation exchange resin, the metal is replaced by hydrogen, the tetracycline adsorbed and the 12a-deoxytetracycline is in the eluate.

The resins may be used in separate columns, or in the same column, the latter providing successive treatment in one operation. In the latter process, the column consists of two separate layers of the resins, one the cation exchange resin, the other the anion exchange resin. The oxygenation reaction mixture is passed through the column and the eluate contains either the tetracycline product or the 12a-deoxytetracycline starting compound depending on the sequence of resin treatment as described above. Of course, efficiency of a column should be considered in this isolation process, that is, the column should not be overloaded so that the eluate becomes contaminated with undesirable unadsorbed components of the original reaction mixture. As in the ion-exchange art in general, routine experimentation will permit the determination of proper conditions for this process, particularly in light of the specifications of commercially available resins to be used. Such resins find wide use in the art and include, for example, Amberlite IR–45, an amine resin in the acetate salt form, and Amberlite IRC–50, a carboxylic acid resin (H cycle), both of which are available from Rohm & Haas Co. (Philadelphia, Pa.). Alternatively, such resins may be prepared according to known procedures. For example, U.S. Patent 2,340,111 describes the preparation of cationic ion-exchange resins from unsaturated acids, e.g., acrylic acid, and divinylbenzene. Amine anion exchange resins are prepared according to the procedures described in U.S. Patents 2,630,429; 2,630,428; 2,630,427; 2,631,999 and 2,632,000.

After the separation, the adsorbed tetracycline or 12a-deoxytetracycline may be eluted from these resins by standard procedures, e.g., elution with strong acid such as a mineral acid. The use of either sequence of ion-exchange treatment leads to the same overall result, the separation and recovery of the tetracycline product, and the 12a-deoxytetracycline starting compound.

The present isolation and recovery method is particularly valuable for large scale commercial application of the herein-described hydroxylation process since it allows for facile, efficient operation, thus obviating the necessity of costly and time-consuming separation and isolation procedures which normally would be required.

The metal chelates of 12a-deoxytetracyclines used as starting compounds of the present invention are new compounds which are prepared in the conventional manner. The metal chelates of 12a-deoxytetracyclines are complex structures which may be composed of structures containing a 3:1 ratio of the metal to the tetracycline compound up to a 1:3 ratio of metal to tetracycline compound, with intermediate ratios, e.g., 2 metal to 3 tetracyclines. The structural modification of the metal chelate will be determined to a great extent by the ratio of reactants in their preparation and the pH of solutions of the complex. As is well known, variation of the pH of a solution of a metal chelate will result in variation of the structure of the complex. On the basis of ultra-violet absorption spectra, the structure of the 12a-deoxytetracycline metal chelates differs from that of the corresponding tetracycline metal chelates. In the latter, the 11,12-beta-dicarbonyl (rings B and C) system is the focal point of chelate formation whereas in the 12a-deoxytetracyclines the main center of chelate formation appears to reside in the A and B rings, possibly the 1,12-enolic system.

A preferred method of preparing structures having a 1:1 ratio involves merely contacting the 12a-deoxytetracycline with a molar equivalent of the selected salt in a reaction inert solvent, e.g., lower aliphatic alcohols, preferably methanol. The complex is precipitated from the solution by concentration or addition of a non-solvent by conventional means.

A preferred method of preparation of structures having a 1:2 ratio is as follows. The selected 12a-deoxytetracycline is dissolved in an aqueous solution containing sufficient alkali to solubilize the starting compound. A soluble salt of the desired metal is dissolved in a minimum volume of water. The two resulting solutions are simultaneously added to a reaction flask at a rate sufficient to maintain the pH of the resulting mixture at a value of from about 8 to about 9, preferably at about 8.5. The metal chelate separates from the mixture and is collected e.g. by filtration. Intervening structures e.g. those with a 3:2 ratio of metal to tetracycline are prepared employing the correct ratio of starting compounds. In all probability in some of the preparative methods, mixtures of complexes are obtained, the specified form predominating over others. The selected solvent system will also determine the nature of the metal chelate produced, that being most insoluble predominating regardless of the molar ratio of starting materials. Employing these procedures, the new metal chelates of the present invention are prepared. All of the herein described metal chelates are useful as starting compounds in the present process.

The present process is of particular importance as part of an overall synthesis of tetracycline since the 12a-deoxytetracyclines may be synthesized by conventional methods from commonly available intermediates.

The present hydroxylation process possesses a number of unique advantages which make it particularly suitable for large scale, i.e., industrial, production. For example, the conversion yields of tetracycline are upwards of 80 to 90%, although the actual yields range between 20 and 50%. Obviously, the starting 12a-deoxytetracycline compounds may be recovered as described herein and reutilized in the present process. A further advantage of the present process lies in the fact that there are no appreciable quantities of oxidation by-products which normally might be expected in oxidation processes of this type. This certainly is evident by the high conversion yields obtained. When 12a-deoxytetracyclines containing a 4-$NR_1R_2$ group are used as starting compounds, a distinct advantage of the present process is a stero-specificity, i.e., the desired configuration of the 12a-hydroxyl group is obtained, as is indicated by the activity of the tetracycline product. When 4-desdimethylamino-12a-deoxytetracyclines are used, there is obtained, in addition to the 4-desdimethylamino product, a product which is presumed to be a 12a-epitetracycline. It is, of course, expected that if the 12a-hydroxyl group is not in the proper configuration the corresponding product would not have the same biological activity as the corresponding tetracycline compound. The 12a-deoxytetracyclines are only sparingly soluble in most solvents, including those utilized in the present process. For example, they do not readily dissolve in water but may be dissolved with some difficulty in comparatively strong acid solution. During the course of such dissolution, the use of strong acids leads to the formation of anhydro compounds, e.g., the 5a,6-anhydro-12a-deoxytetracycline which are not as desirable as the normal tetracycline compounds. The use of the metal chelates of the 12a-deoxytetracyclines as starting compounds in this process affords, in addition to the above mentioned advantages, improved solubility of the starting compounds which enable the use of concentrated reaction mixtures thus lending to the efficiency of the process.

The outstanding results of the present process are apparently only obtainable when employing a metal chelate salt of the 12a-deoxytetracyclines. The use of non-chelating metal in the present process does not result in the tetracycline products obtained by the present process. For example, 12a-deoxytetracycline is oxygenated in dry methanol containing sodium nitrite according to the present process. After 3½ hours, an unsuccessful attempt was made to isolate tetracycline from the reaction mixture. When 12a-deoxytetracycline was oxygenated in water over pH readings of from 2 to 11 in the presence of sodium chloride, no tetracycline products were recovered from the reaction mixture.

The following examples are given by way of illustration and are not to be construed as limitations of this invention, many variations of which are possible without departing from the scope and spirit thereof.

EXAMPLE I

*12a-hydroxylation of 12a-deoxytetracyclines*

A solution of 200 mg. of 12a-deoxytetracycline in 200 ml. of dry methanol containing 110 milligrams of manganese chloride hexahydrate is treated by passing oxygen gas through the solution for 4½ hours. Bioassay of the reaction mixture at the end of this period (*K. pneumoniae*) gives a value of 275 mcg. of tetracycline activity per mg.

The final reaction volume is adjusted to 200 ml., 180 ml. of this mixture is divided into two equal portions for ion-exchange treatment. One portion is passed on an ion-exchange column consisting of an anion exchange resin (an amine anion resin prepared according to the example of U.S. Patent No. 2,630,429 which is converted to the acetate salt by treatment with an aqueous solution of acetic acid and subsequent washings to remove excess acetic acid) and a cation exchange resin (a carboxylic acid resin-H cycle prepared according to the procedure described in a subsequent example). The resins are arranged in the order indicated and the reaction mixture passed through the combined resin layers. The eluate contains 76 milligrams of 12a-deoxytetracycline as the acetic acid salt representing a 74% recovery of starting compound.

Tetracycline is eluted from the cation exchange resin by treatment with dilute hydrochloric acid and concentration of the eluate to obtain the crystalline hydrochloride. The second equal portion of the reaction mixture is passed over a column in the same fashion as described above with the exception that the sequence of resin treatment is reversed, i.e., the reaction mixture is passed first through the cation exchange resin followed by the anion exchange resin. The resins used are the same as above described. The eluate from this column contains 27 milligrams of a mixture consisting of 80% tetracycline and 20% 4-epitetracycline with some trace amounts of 5a,6-anhydro compounds. Bioassay of the mixture shows an activity of from 760 to 810 mcg. of tetracycline activity per mg. Unreacted 12a-deoxytetracycline is eluted from the anion exchange resin by treatment with dilute hydrochloric acid. Bioassay of the starting compound gives a value of 32 mcg./mg.

EXAMPLE II

The procedure of Example I is repeated using 120 mg. of manganese acetate tetrahydrate in place of the manganese chloride. Oxygen is bubbled through the reaction mixture for 3 hours at room temperature after which the mixture is evaporated to dryness. Bioassay of the residue indicates a 25.5% yield of tetracycline. The tetracycline is separated from unreacted 12a-deoxytetracycline by the ion-exchange treatment described in Example I.

The tetracycline product is also separated from the 12a-deoxytetracycline starting compound on a paper column saturated with a McIlvaine pH 4.5 buffer serving as the immobile phase, the mobile phase being a 20:10:3 nitromethane:chloroform:pyridine solvent system. In this system 12a-deoxytetracycline has an Rf value of 0.8 while tetracycline 0.45 to 0.5. 4-epitetracycline has an Rf value of 0.2 in the same system and is also separated in this procedure.

EXAMPLE III

The procedure of Example I is repeated with the exception that 79.4 mg. of silver nitrate is used in place of manganese chloride. Bioassay of the reaction mixture shows the tetracycline activity of 355 mcg. per mg.

EXAMPLE IV

A solution of 5 grams of 12a-deoxytetracycline in 350 ml. of methanol containing 3 grams of manganese chloride hexahydrate is oxygenated according to the procedure of Example I with equivalent results. Tetracycline and unreacted 12a-deoxytetracycline are recovered by the procedure described in Example I.

EXAMPLE V

A solution of 20 mg. of 12a-deoxytetracycline in 10 ml. of absolute mehanol containing 16 mg. of cerium chloride heptahydrate and 10 ml. of ph 3 buffer solution is oxygenated for 3 hours. This procedure is repeated at pH 4, 5, 6, 7, 8, 9, 10 and 11. At each pH the resulting solution assayed for tetracycline. The results showed that optimum yields are obtained at pH 4, 5, 9.5, 10 and 11.

The buffers used in these experiments are standard buffer solutions known in the art. For example, for pH 3, 4, 5, 6, 7 and 8, McIlvaine buffer is used and for pH 9, 10 and 11, Sorensen-Walbum buffer.

These reactions at various pH's are repeated using manganese chloride instead of cerium chloride. The results are in accordance with those obtained with cerium chloride.

EXAMPLE VI

The procedure of the preceding examples is repeated employing a number of chelating metals with comparable results. The general procedure used is as follows:

A solution of 100 mg. of 12a-deoxytetracycline in 100 ml. of absolute methanol containing the appropriate metal salts required to produce the corresponding chelate, is saturated with oxygen or air, or reacted with peroxide for 3 hours, after which the solution is bioassayed for the tetracycline present. The results with several metal salts are found in Table I.

TABLE I

| Metal Salt | Amount in mg. | Bioassay Results | | |
|---|---|---|---|---|
| | | $O_2$ | $H_2O_2$ | Air |
| $CeCl_3, 7H_2O$ | 160 | 215 | | 205 |
| $MnCl_2, 6H_2O$ | 120 | 210 | 185 | 215 |
| | | 210 | 190 | 240 |
| | | 175 | 71 | 180 |
| $CoCl_2, 3H_2O$ | 120 | 190 | 85 | 175 |
| | | | 84 | |

EXAMPLE VII

The procedure of Example VI is repeated employing the following metal salts: cadmium chloride, stannous chloride dihydrate, nickel chloride hexahydrate, zinc chloride, platinum chloride, calcium chloride, barium chloride, strontium chloride, chromic chloride with comparable results.

EXAMPLE VIII

A solution of 70 mg. of 12a-deoxytetracycline in 35 ml. of methanol and 35 ml. of aqueous buffer (pH 10) containing 38.3 mg. of manganese chloride hexahydrate is treated by bubbling air through the solution. After 30 minutes the reaction mixture on bioassay shows a tetracycline activity of 205 mcg./ml. for a 20% conversion to tetracycline.

This procedure is repeated with the exception that 61.1 mg. of cerium chloride heptahydrate is used in place of the manganese chloride salt. After 15 minutes bioassay of the reaction mixture indicates a tetracycline activity of greater than 415 mcg. per mg.

EXAMPLE IX

The procedure of Example VIII is repeated at pH 4.5 instead of pH 10. With manganese chloride, after 15 minutes, bioassay of the reaction mixture shows a tetracycline activity of 305 mcg. per mg. With cerium chloride, bioassay shows a tetracycline activity of 270 mcg. per mg.

EXAMPLE X

*12a-hydroxylation of 12a-deoxy-4-desdimethylamino-7-chlortetracycline*

A solution of 20 mg. of 12a-deoxy-4-desdimethylamino-7-chlortetracycline in 20 ml. of methanol containing 11.2 mg. of manganese chloride hexahydrate and 5 drops of triethylamine is oxygenated for 4 hours. At the end of this time bioassay of the reaction mixture shows a tetracycline activity of 175 mcg. per mg. The 4-desdimethylamino-7-chlortetracycline is separated from the starting 12a-deoxy compound by column chromatography using the system described in Example II. Pure 4-desdimethylamino-7-chlortetracycline assays at 500 mcg. of tetracycline activity per mg. The starting compound on the other hand, assays at only 54 mcg. per mg.

EXAMPLE XI

*12a-hydroxylation of 4-desdimethylamino-5-hydroxy-12a-deoxytetracycline*

A solution of 20 mg. of 4-desdimethylamino-5-hydroxy-12a-deoxytetracycline in 20 ml. of methanol containing 11.7 mg. of manganese chloride hexahydrate and 5 drops of triethylamine is oxygenated for a period of 4 hours. At the end of this time, the reaction mixture assays at 125 mcg. of tetracycline activity per mg. which indicates a 50% yield of 4-desdimethylamino-5-hydroxytetracycline. The pure compound assays at 250 mcg. tetracycline activity per mg. and the starting compound at 6 mcg. per mg.

EXAMPLE XII

*12a-hydroxylation of 4-desdimethylamino-12a-deoxy-7-chlorotetracycline*

A mixture of 30 g. of 4-desdimethylamino-12a-deoxy-7-chlorotetracycline and 26.6 of cerium chloride heptahydrate in 300 ml. of methanol containing 10 ml. of triethylamine is oxygenated for 3 hours. The product, 4-desdimethylamino-7-chlorotetracycline, is obtained by the method of the previous examples.

EXAMPLE XIII

A mixture of 30 g. of 12a-deoxytetracycline and 26.6 g. of cerium chloride heptahydrate in 300 ml. of methanol is oxygenated for 30 hours. The product, which consists of tetracycline and 4-epitetracycline, is obtained by the usual method.

EXAMPLE XIV

The procedure of Example XII is repeated using in lieu of triethylamine, the following tertiary amines: trimethylamine, dimethylaniline, dimethylbutylamine, tripropylamine, diethylaniline, dimethyl-p-toluidine, pyridine, 2-ethylpyridine, a-picoline, dimethylbenzylamine, methyl diethylamine, tributylamine and other hydrocarbon tertiary amines with similar results.

EXAMPLE XV

A mixture of 10 g. of 12a-deoxy-4-desdimethylamino-5-hydroxytetracycline and 10 g. of manganous chloride tetrahydrate in 300 ml. of methanol is aerated for 3 days. The mixture assays at 22 mcg. of tetracycline activity per mg. The pure product assays at 250 mcg./mg. and the starting compound at 6 mcg./mg. The product, 4-desdimethylamino-5-hydroxytetracycline, is separated by use of a paper column using one of the following solvent systems:

| Mobile Phase | Immobile Phase |
| --- | --- |
| 20:3 toluene:pyridine saturated with pH 4.2 buffer. | pH 4.2 buffer. |
| 1:1 benzene:chloroform saturated with water. | pH 4.2 buffer. |

EXAMPLE XVI

The procedure of Example XIII is repeated with the following 12a-deoxytetracycline as starting compounds:

6,12a-dideoxytetracycline
6-demethyl-12a-deoxytetracycline
6,12a-dideoxy-5-hydroxytetracycline
6-demethyl-6,12a-dideoxytetracycline
12a-deoxy-7-chlorotetracycline to produce the corresponding tetracycline compounds.

EXAMPLE XVII

The procedure of Example XII is repeated with the following starting compounds:

6,12a-dideoxy-4-desdimethylaminotetracycline
6-demethyl-12a-deoxy-4-desdimethylaminotetracycline
6,12a-dideoxy-4-desdimethylamino-5-hydroxytetracycline
6-demethyl-6,12a-dideoxy-4-desdimethylaminotetracycline

EXAMPLE XVIII

Raney iron (20 mg.), 12a-deoxytetracycline (30 mg.) and 30 ml. dimethylformamide are thoroughly shaken for 1 hour. The mixture is then filtered through Supercel and the filtrate divided into two equal portions. One portion is treated with hydrogen peroxide ($1 \times 10^{-2}$ g.) for two hours at the end of which time it is bioassayed (*K. pneumoniae*) for tetracycline activity. The second or control portion of the filtrate, unoxygenated, is also bioassayed with the following results:

|  | Mcg./mg. |
| --- | --- |
| Control | 47 |
| Oxygenated portion | 130 |

EXAMPLE XIX

The procedure of Example XVIII is repeated with the following metal sources:

| Metal Source | Control | Oxygenated Portion |
| --- | --- | --- |
| Ruthenium (5%) on carbon | 41 | 125 |
| Silver (5%) on CaCO₃ | 61 | 120 |
| Ruthenium oxide | 35 | 75 |

EXAMPLE XX

The procedure of Example XVIII is repeated using the following elemental metals in place of Raney iron:

ruthenium on carbon (5%)
platinum on carbon (5%)
iridium on carbon (5%)
palladium on carbon (10%)
silver on carbon (5%)
rhenium on carbon (5%)
palladium on zinc oxide (5%)
palladium on CaCO₃ (5%)
ruthenium black
palladium oxide
Raney cobalt
platinum on carbon (10%)

Bioassay of the reaction mixtures shows the tetracycline activity to be substantially greater than that of the controls.

EXAMPLE XXI

Oxygen gas is bubbled into a well-stirred mixture of 200 mg. 12a-deoxytetracycline, 1.0 g. ruthenium on carbon (5%) and 200 ml. 2-methoxyethanol at 20° C. for 4 hours. Bioassay of the filtered reaction mixture at the end of this period (*Klebsiella pneumoniae*) gives a tetracycline activity value of greater than 250 mcg./mg. The reaction mixture is filtered and evaporated to dryness under reduced pressure to give a crude product comprising tetracycline, 4-epitetracycline and 12a-deoxytetracycline.

EXAMPLE XXII

Repetition of the procedure of Example XXI but using the following solvents in place of 2-methoxyethanol also produces tetracycline: methanol, ethanol, tetrahydrofuran, dimethylformamide, 1,2-dimethoxyethane, dioxane and the dimethyl ether of diethylene glycol. Dimethylformamide and the lower alkyl ethers of ethylene glycol (mono- and di-ethers) produce optimum yields of tetracycline.

EXAMPLE XXIII

The procedure of Example XXI is repeated using the following elemental metals in place of palladium on carbon (5%) in the form of finely divided solids.

palladium
platinum
ruthenium
rhenium
iridium containing 0.10% osmium
silver

Each of the reaction mixtures gives a positive assay for tetracycline.

EXAMPLE XXIV

To a solution of 100 mg. of 12a-deoxytetracycline in 100 ml. of dry 2-ethoxyethanol at 25° C. there is added 0.5 g. of palladium on carbon (5%) and $2.1 \times 10^{-2}$ g. of hydrogen peroxide (5 molar equivalents). The reaction mixture is stirred for 3 hours then bioassayed for tetracycline. The tetracycline product is recovered by the procedure of Example II.

Repetition of this procedure but using the following 12a-deoxy compounds in place of 12a-deoxytetracycline produces the corresponding tetracycline as evidenced by the substantial increase in bioassay of the product over that of the precursor 12a-deoxy compound:

6-demethyl-6,12a-dideoxytetracycline
6-demethyl-12a-deoxytetracycline
6,12a-dideoxytetracycline
4-desdimethylamino-12a-deoxytetracycline
4-desdimethylamino-7-chloro-12a-deoxytetracycline
5-hydroxy-12a-deoxytetracycline
4-desdimethylamino-5-hydroxy-6,12a-dideoxytetracycline

EXAMPLE XXV

The procedure of Examples XVI and XXIV are repeated using, in lieu of hydrogen peroxide, sodium peroxide, potassium peroxide, lithium peroxide, peracetic and perbenzoic acids and N-oxides of the following tertiary amines; triethylamine, trimethylamine, dimethylaniline, dimethylbutylamine, tripropylamine, diethylaniline, dimethyl-p-toluidine, pyridine, 2-ethylpyridine, a-picoline, dimethylbenzylamine, methyl diethylamine, tributylamine and other hydrocarbon tertiary amines with similar results.

EXAMPLE XXVI

The procedure of Example XXI is repeated using the following metal sources:

platinum oxide
silver oxide on silica gel (10%)
AgNO₃/alumina (6%)
silver oxide on Bentonite (clay) (5%)
silver oxide on silica gel containing 0.1% osmium tetroxide
Raney nickel
palladium oxide
silver on calcium carbonate (6%)
palladium on lead carbonate (5%)

palladium on zinc oxide (5%)
calcium oxide
rhodium (sponge)

Silver salts, in particular, silver oxide on silica gel and silver nitrate on alumina demonstrate good activity in this transformation. A trace, 0.1% by weight, of osmium tetroxide increases the activity of silver nitrate on alumina.

EXAMPLE XXVII

Several reaction systems of the following composition are set-up, each at a different temperature, and treated by bubbling oxygen gas into the well stirred mixtures for 6 hours:

100 mg. 12a-deoxytetracycline
100 ml. 2-methoxyethanol
2.5 g. silver oxide on silica gel (10%)

The temperature values used range from 0° C. to 100° C. in increments of 10° C. Tetracycline formation is realized over this entire range, while the 20° C. to 50° C. range produces satisfactory yields; optimum yields are obtained in the 20° C. to 30° C. range.

EXAMPLE XXVIII

The procedure of Example XXVII is repeated at 30° C. but using air as the oxidizing agent in lieu of oxygen gas with comparable results.

EXAMPLE XXIX

Employing the procedure of Example XXVIII the following 12a-deoxy compounds are converted to their corresponding tetracyclines:

6-demethyl-6,12a-dideoxy-7-chlorotetracycline
6-demethyl-6,12a-dideoxytetracycline
6-12a-dideoxytetracycline
4-desdimethylamino-5-hydroxy-12a-deoxytetracycline
4-desdimethylamino-12a-deoxytetracycline
4-desdimethylamino-6-demethyl-6,12a-dideoxytetracycline
4-desdimethylamino-5-hydroxy-6,12a-dideoxytetracycline
6-demethyl-6,12a-dideoxytetracycline-2-nitrile
N-t-butyl-6-demethyl-6,12a-dideoxytetracycline

EXAMPLE XXX

A mixture of 200 mg. 12a-deoxytetracycline, 0.1 g. osmium tetroxide, $4 \times 10^{-2}$ g. of hydrogen peroxide and 200 ml. of water at pH 4.4 is stirred vigorously at room temperature for 3 hours then bioassayed for tetracycline. The tetracycline product is recovered by the procedure of Example II.

EXAMPLE XXXI

The procedure of Example XXX is repeated but at pH levels of 6.0, 7.8, 9.5, 11.0. In each instance, tetracycline is produced.

EXAMPLE XXXII

Repetition of the procedure of Example XXX but employing the following metal sources in place of osmium tetroxide produces substantially the same results:

copper on zinc dust (3.5%)    Raney iron
palladium on carbon (5%)      Raney cobalt
palladium (finely divided)    Chromium trioxide
silver oxide                  vanadium pentoxide
platinum on carbon (5%)       $CO_2O_3/Fe_2O_3$ (3:7)

EXAMPLE XXXIII

Repetition of the procedure of Example XXXI but using air as oxidizing agent in lieu of hydrogen peroxide produces substantially the same results.

EXAMPLE XXXIV

*Preparation of metal chelates of 12a-deoxytetracycline*

A solution of 136.75 mg. of manganese chloride hexahydrate in a minimum volume of water is carefully added to a beaker together with a solution of 500 mg. of 12a-deoxytetracycline in water to which is added enough sodium hydroxide to dissolve the tetracycline compound. The beaker is fitted with a pH meter and as the two solutions are mixed the pH is controlled so as to provide a pH of about 8.5. If the solution becomes too alkaline, the addition of a few drops of hydrochloric acid will adjust it to the desired pH. To avoid any air oxidation of the metal chelate during preparation the entire procedure is carried on under an atmosphere of nitrogen. The metal chelate separates from the mixture as a finely divided microcrystalline solid and is filtered and dried.

Employing the procedure by reaction of a 2:1 molar ratio of starting compound to selected metal, metal chelates of 12a-deoxytetracyclines of the following formula are prepared:

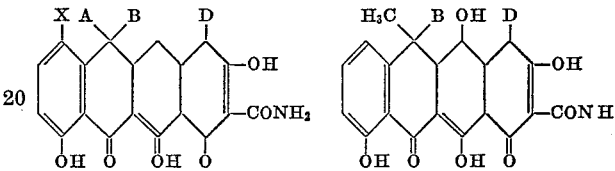

wherein

X is hydrogen, chloro or bromo;
A is hydrogen or methyl;
B is hydrogen or hydroxyl; and
D is hydrogen or $N(CH_3)_2$.

Exemplary of these compounds are the following:

cerium 6-demethyl-6,12a-dideoxy-7-chlortetracycline
calcium 6,12a-dideoxytetracycline
cerium 12a-deoxytetracycline
manganous 12a-deoxytetracycline
silver 12a-deoxytetracycline
silver 6-demethyl-6,12a-dideoxytetracycline
cerium 6-demethyl-6,12a-dideoxytetracycline
manganous 6-demethyl-6,12a-dideoxytetracycline
manganous 4-desdimethylamino-12a-deoxy-5-hydroxytetracycline
cerium 4-desdimethylamino-12a-deoxytetracycline
platinum 12a-deoxytetracycline
vanadium 12a-deoxytetracycline
barium 12a-deoxytetracycline
titanium 12a-deoxytetracycline
strontium 12a-deoxytetracycline
cadmium 12a-deoxytetracycline
palladium 12a-deoxytetracycline
zinc 12a-deoxytetracycline
cobalt 12a-deoxytetracycline
nickel 12a-deoxytetracycline
lead 4-desdimethylamino-6,12a-dideoxytetracycline
tin 4-desdimethylamino-6,12a-dideoxytetracycline
chromium 12a-deoxytetracycline
cerium 6-demethyl-6,12a-dideoxy-4-desdimethylaminotetracycline
manganous 6-demethyl-6,12a-dideoxy-4-desdimethylaminotetracycline
silver 6-demethyl-6,12a-dideoxy-4-desdimethylaminotetracycline
cerium 4-desdimethylamino-12a-deoxytetracycline The above metal chelates are used in the process of the preceding examples and are converted to the corresponding tetracycline compounds. For example, 25 g. of the metal chelate, cerium 12a-deoxytetracycline, in 500 ml. of methanol is oxygenated for 3 hours to obtain tetracycline, which is separated on a paper column using the aforementioned solvent systems.

EXAMPLE XXXV

*Metal chelates of 12a-deoxytetracyclines*

The metal salt complexes of 12a-deoxytetracyclines are prepared by dissolving them in a lower aliphatic alcohol, preferably methanol, and treating with an equimolar amount of the selected metal salt, preferably dissolved in the selected alcohol. The complexes are isolated in some instances by simple filtration, but often, since many of them are alcohol soluble, by evaporation of the solvent or addition of a non-solvent such as diethyl ether.

In this fashion, metal salt complexes of the 12a-deoxytetracyclines consisting primarily of compounds containing a 1:1 ratio of metal to tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, vanadium chloride, plumbous acetate, stannous bromide, zinc sulfate, chromous chloride and nickellous chloride.

These metal complex salts are also useful in the process of the preceding examples as starting compounds for the preparation of corresponding tetracyclines.

EXAMPLE XXXVI

*Preparation of carboxylic acid resins*

A mixture of methacrylic acid with 5% divinylbenzene is polymerized by adding 1% benzoyl peroxide catalyst and heating in a closed vessel at 60° C. for 24 hours. The resulting polymer is ground to fine particle size, washed with 8% aqueous sodium hydroxide solution, rinsed with water and screened to a mesh range of about 14 to 45 on the U.S. Standard Sieve Scale. The screened resin is treated with 3 volumes of 2 N hydrochloric acid and water-washed.

EXAMPLE XXXVII

The procedure of Example I is repeated using, in lieu of methanol, the following solvents: ethanol, dioxane, dimethyl formamide, diethyl ether, tetrahydrofuran, acetic acid, the dimethyl ether of diethylene glycol and the monomethyl ether of ethylene glycol. Comparable results are obtained.

EXAMPLE XXXVIII

The procedure of Example I is repeated using, in lieu of manganese chloride, the following magnesium salts: magnesium chloride, magnesium acetate, magnesium ammonium sulfate, magnesium ammonium chloride, magnesium iodide, magnesium bromate, magnesium thiosulfate, dibasic magnesium citrate, and magnesium sulfate.

In each case tetracycline is obtained in comparable yields.

EXAMPLE XXXIX

A mixture of 30 g. of each of the following 12a-deoxytetracyclines and 26.6 g. of cerium chloride heptahydrate in 300 ml. of methanol is oxygenated for 30 hours to obtain the desired product.

5a-6-anhydro-7-chloro-12a-deoxytetracycline
5a,6-anhydro-6-demethyl-12a-deoxytetracycline
5a,6-anhydro-12a-deoxytetracycline
5a,6-anhydro-6-demethyl-7-chloro-12a-deoxytetracycline
7-amino-6-demethyl-6,12a-dideoxytetracycline
9-amino-6-demethyl-6,12a-dideoxytetracycline
9-chloro-6-demethyl-6,12a-dideoxytetracycline
9-nitro-6-demethyl-6,12a-dideoxytetracycline
7-amino-12a-deoxytetracycline
7-amino-6,12a-dideoxytetracycline
7-cyanato-6-demethyl-12a-deoxytetracycline
9-methylmercapto-6,12a-dideoxytetracycline
7-amino-5-hydroxy-12a-deoxytetracycline 7-methylmercapto-6-demethyl-6,12a-dideoxytetracycline
7-phenylmercapto-6-demethyl-6,12a-dideoxytetracycline
7-arsenoxy-5-hydroxy-6,12a-dideoxytetracycline
9-amino-12a-deoxytetracycline

EXAMPLE XL

The procedure of Example XXXIX is repeated with the following starting materials:

7-cyano-6,12a-dideoxy-4-desdimethylaminotetracycline
9-amino-6,12a-dideoxy-4-desdimethylaminotetracycline together with 10 ml. of trimethylamine, the oxygenation being carried out for but 3 hours. The desired products are obtained.

What is claimed is:

1. The process which comprises contacting metal chelate of a 12a-deoxytetracycline with an oxidizing substance in a reaction inert solvent, the pH in an aqueous reaction-inert solvent system being from about 2 to about 11, said metal of said chelate being selected from the group consisting of those in groups IB, IIB, IIIB, IVB, VB, VIB, VIIB, VIII, IIA, IIIA and IVA of the Periodic Chart of the Elements, said oxidizing substance being selected from the group consisting of air, oxygen, hydrogen peroxide, alkali metal peroxides and N-oxides of hydrocarbon tertiary amines, and said 12a-deoxytetracycline being selected from the group consisting of

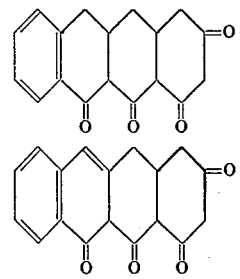

tautomeric forms thereof and mono- and poly-substituted analogs thereof, the substitution of said substituted analogs being limited to the 2, 4, 4a, 5, 5a, 6, 7, 8, 9, 10 and 11a positions.

2. The process as in claim 1 wherein the metal is a group VIII metal.

3. The process as in claim 1 wherein the metal is silver.

4. The process as in claim 1 wherein the pH is from about 9.5 to about 11.

5. The process as in claim 1 wherein the pH is from about 4.0 to about 5.0.

6. The process as in claim 1 wherein the metal chelate is formed in situ.

7. The process as in claim 1 wherein the reaction is conducted at a temperature of from about 20° to about 30° C.

References Cited by the Examiner

UNITED STATES PATENTS 3,043,877   7/62   Holmlund et al. _____ 260—559

OTHER REFERENCES

Bergmann, The Chemistry of Acetylene and Related Compounds, p. 80 (1948).

IRVING MARCUS, *Primary Examiner.*

NICHOLAS S. RIZZO, *Examiner.*

UNITED STATES PATENT OFFICE
CERTIFICATE OF CORRECTION

Patent No. 3,188,348 June 8, 1965

Kenneth Butler et al.

It is hereby certified that error appears in the above numbered patent requiring correction and that the said Letters Patent should read as corrected below.

Column 13, in the table of Example XIX, under the column heading "Control", line 3 thereof, for "35" read -- 45 --.

Signed and sealed this 21st day of December 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,188,348                                                               June 8, 1965

Kenneth Butler et al.

It is hereby certified that error appears in the above numbered patent requiring correction and that the said Letters Patent should read as corrected below.

Column 13, in the table of Example XIX, under the column heading "Control", line 3 thereof, for "35" read -- 45 --.

Signed and sealed this 21st day of December 1965.

(SEAL)
Attest:

ERNEST W. SWIDER
Attesting Officer

EDWARD J. BRENNER
Commissioner of Patents